United States Patent
Hama et al.

(10) Patent No.: US 6,919,026 B2
(45) Date of Patent: Jul. 19, 2005

(54) SEMIPERMEABLE MEMBRANE SUPPORT AND PROCESS OF PREPARATION THEREOF

(75) Inventors: Yoshitsugu Hama, Naruto (JP); Yoshifumi Kusaka, Tokushima (JP); Akihiro Okubo, Itano-gun (JP)

(73) Assignees: Awa Paper Mfg. Co., Ltd., Tokushima (JP); Nitto Denko Corporation, Osaka (JP)

(*) Notice: Subject to any disclaimer, the term of this patent is extended or adjusted under 35 U.S.C. 154(b) by 0 days.

(21) Appl. No.: 09/955,969

(22) Filed: Sep. 20, 2001

(65) Prior Publication Data

US 2002/0056535 A1 May 16, 2002

(30) Foreign Application Priority Data

Sep. 22, 2000 (JP) .................................. 2000-289409

(51) Int. Cl.[7] .................. B01D 63/00; D21F 11/00; D04H 1/00
(52) U.S. Cl. .................... 210/500.21; 210/500.22; 210/321.6; 210/490; 210/491; 210/652; 428/297.1; 428/299.7; 162/157.3; 442/327; 442/341; 442/344; 442/346; 442/361; 442/374
(58) Field of Search .................. 210/500.21, 500.22, 210/321.6, 490, 491, 652; 428/297.1, 299.7; 162/157.3; 442/327, 341, 344, 346, 361, 374

(56) References Cited

U.S. PATENT DOCUMENTS

| | | | | |
|---|---|---|---|---|
| 4,180,611 A | * | 12/1979 | Schultheiss et al. | 442/337 |
| 4,728,394 A | * | 3/1988 | Shinjou et al. | 162/129 |
| 4,795,559 A | * | 1/1989 | Shinjou et al. | 210/490 |
| 5,133,835 A | * | 7/1992 | Goettmann et al. | 162/146 |
| 5,614,095 A | * | 3/1997 | Degen et al. | 210/491 |
| 5,851,355 A | * | 12/1998 | Goettmann | 162/157.3 |
| 6,277,282 B1 | * | 8/2001 | Kihara et al. | 210/652 |

FOREIGN PATENT DOCUMENTS

| | | |
|---|---|---|
| JP | 60-238103 | 11/1985 |
| JP | 61-222506 | 10/1986 |
| JP | 5-35009 | 5/1993 |
| JP | 10-225630 | 8/1998 |

OTHER PUBLICATIONS

Warren, et al; "The Evolution of a Spunbonded Non–Woven for Filtration Applications", DuPont; 2000, <printed from the interne www.filtration.dupont.com/lit/2000.pdf>.*

* cited by examiner

*Primary Examiner*—Joseph Drodge
*Assistant Examiner*—Krishnan S Menon
(74) *Attorney, Agent, or Firm*—Wenderoth, Lind & Ponack, L.L.P.

(57) ABSTRACT

A semipermeable membrane support includes, a non-woven fabric including main fiber and binder fiber, both of which are formed of synthetic resin fine fiber, the non-woven fabric being manufactured by heating and pressing after paper making, wherein the semipermeable membrane support has a ratio of a tensile strength in a paper feeding direction to that in a width direction of 2:1 to 1:1.

11 Claims, 2 Drawing Sheets

SEMIPERMEABLE MEMBRANE SUPPORT AND PROCESS OF PREPARATION THEREOF

FIELD OF INVENTION

The present invention relates to a semipermeable membrane support and a process of making the same.

DESCRIPTION OF THE RELATED ART

Conventionally, the support having a laminated double layered structure which includes a high density non-woven fabric and a low density non-woven fabric has been proposed as a semipermeable membrane support (Japanese Patent Laid-Open Publication No. Shou 60-238103 and Japanese Patent Examined Publication No. Hei 5-35009). On the other hand, the support having a single layer structure has been also proposed so as to simplify the manufacturing method and lower production costs. (Japanese Patent Laid-Open Publication No. Hei 10-225630)

However, it is difficult to expect the similar effect in the single layer structure to that in the double layered structure. On the other hand, the cost of manufacturing the support having a multi-layered structure including a double layered structure is high. Therefore, in term of costs, the manufacturing method is desired wherein a predetermined difference in surface roughness between the front surface and the rear surface is provided in the single layer structure to ensure a prescribed filtration resistance. However, when the (polymer) casting solution is applied to one face of the support, the support bends in the width direction, which becomes a hindrance to the treatment in the coagulation and rinsing bath following the roll feed, resulting in an uneven semipermeable membrane produced.

The inventors directed their attention to the fact that such a cause can be reduced by setting suitable conditions in the paper making and have studied wholeheartedly. The inventors found that a main cause is in that the ratio of the tensile strength of the support in the paper feeding direction to that in the width direction is more than 2:1, and that when the (polymer) casting solution is applied to the support, the support bends in the width direction and becomes an obstacle in the process within the coagulation and rinsing bath after roll feeding. The bend of the support caused by the application of the semipermiable membrane solution to the support having a large tensile strength ratio can be reduced to some extent by increasing the weight of the support. But, in such a case, the cost is high and the thickness of the support is large, resulting in problem of the membrane area being reduced within a certain volume.

SUMMARY OF THE INVENTION

The present invention has been developed to overcome the above-described disadvantages.

It is accordingly an objective of the present invention to provide a support and a process of producing the same without an obstacle to the manufacturing of a semipermeable membrane from the base paper.

According to the present invention, there is provided a semipermeable membrane support which includes a non-woven fabric including main fiber and binder fiber, both of which are formed of synthetic resin fine fiber, the non-woven fabric being manufactured by heating and pressing after paper making, wherein the semipermeable membrane support has a ratio of a tensile strength in a paper feeding direction to that in a width direction of 2:1 to 1:1, to prevent the bend in the width direction during the semipermeable membrane formation.

According to the present invention, there is provided a semipermeable membrane support which includes a non-woven fabric formed from a main fiber and a binder fiber made of polyester fiber having an average single fiber fineness of 0.6 to 8.9 decitex and manufactured by treating in the thermal pressing process after paper making, wherein the support has an air permeability of 0.5 to 7.0 $cc/cm^2/sec$ and an average pore size of 5 to 15 $\mu m$ as well as a ratio of a tensile strength in the paper feeding direction to that in a width direction of not more than 2:1, to restrict the bend thereof to within the tolerable range during the roller feeding in the semipermeable membrane formation, resulting in increase of the quality precision. More preferably, the ratio of the tensile strength in the paper feeding direction to that in the width direction may be not more than 1.5:1.

When the semipermeable membrane support has an air permeability of not more than 0.5 $cc/cm^2/sec$, or has an average pore size of not more than 5 $\mu m$, the penetration of the (polymer) casting solution into the semipermeable membrane support is disturbed and thereby, the problem of decrease of adhesive strength between the semipermeable membrane and the semipermeable membrane support due to insufficient anchor effect is likely to come up. On the contrary, when the semipermeable membrane support has an air permeability of not less than 7.0 $cc/cm^2/sec$, or has an average pore size of not less than 15 $\mu m$, the penetration of the (polymer) casting solution into the semipermeable membrane support is too much and thereby, the problem of partial over-penetration of the (polymer) casting solution to the back surface is likely to come up.

A method of manufacturing a semipermeable membrane support of the present invention includes the steps of:

preparing a dispersed and mixed solution by dispersing and mixing in a solution main fiber and binder fiber, both of which are formed of polyester fiber having an average single fiber fineness of 0.6 to 8.9 decitex, in a mixing ratio of 20:80 to 70:30;

making paper from the dispersed and mixed solution while controlling a flow rate of the dispersed and mixed solution so that the semipermeable membrane support has a ratio of tensile strength in a paper feeding direction to that in a width direction of 2:1 to 1:1; and heating and pressing the paper so that the semipermeable membrane support has a surface roughness of a front surface which is larger than that of a rear surface by 15% or more after drying.

Using the above-mentioned support, that is, the semipermeable membrane support which includes a non-woven fabric including a main fiber and a binder fiber formed from synthetic resin fine fibers having an average single fiber fineness of 0.6 to 8.9 decitex and manufactured by treating in the thermal pressing process after paper making, wherein the support has a ratio of a tensile strength in the paper feeding direction to that in the width direction of 2:1 to 1:1, even when a polymer solution is applied to at least one surface of the support, the treatment in the coagulation and rinsing bath without any obstacles can be achieved after roll feeding with no bend in the width direction, resulting in formation of a semipermeable membrane with excellent quality. Preferably, the support has an air permeability of 0.5 to 7.0 $cc/cm^2/sec$ and an average pore size of 5 to 15 $\mu m$.

BRIEF DESCRIPTION OF THE DRAWINGS

The above and other objectives and features of the present invention will become more apparent from the following description of a preferred embodiment thereof with reference to accompanying drawings, throughout which like parts are designated by like reference numerals, and wherein.

DETAILED DESCRIPTION OF THE PREFERRED EMBODIMENTS

This application is based on application No.2000-289409 filed in Japan, the content of which is incorporated herein by reference.

Figure 1:
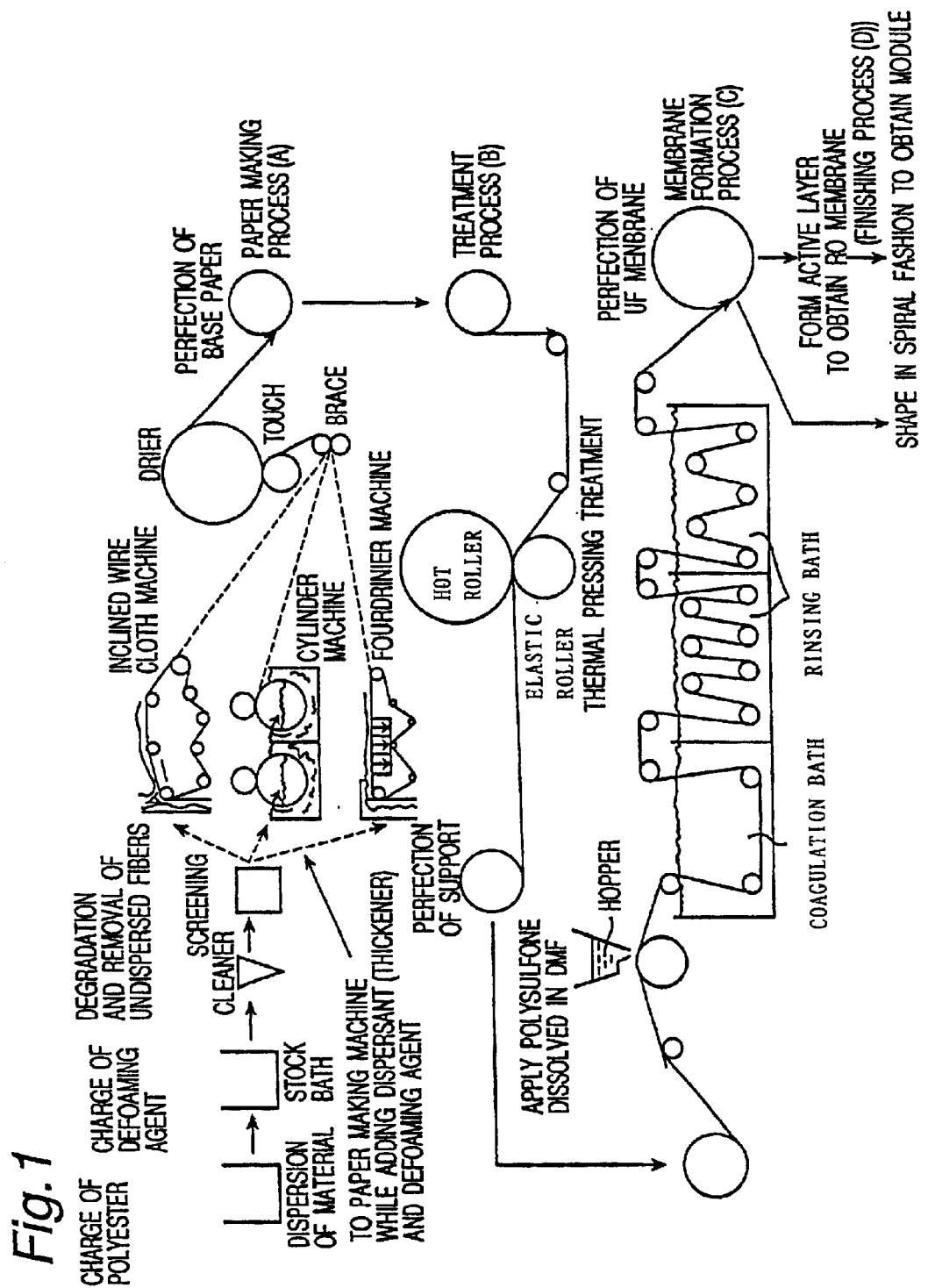
FIG. 1 shows a process drawing according to the present invention.

The present invention will be described in detail with reference to FIG. 1 showing an embodiment of the present invention.

The process for making the support of the present invention comprises (A) making paper and (B) processing the resulting paper. The process for making a semipermeable membrane such as a reverse osmotic membrane comprises (C) making a semipermeable membrane using the resulting support and (D) forming a skin layer on the semipermeable membrane to obtain a final RO membrane. Main fiber constructing a basic structure in the non-woven fabric which is used in the present invention.

A main fiber made of synthetic resin fiber is preferably polyester fiber having an average single fiber fineness of 0.6 to 8.9 decitex, more preferably 0.6 to 6.7 decitex. If the average single fiber fineness is not more than 0.6 decitex, the semipermeable membrane support is likely to have an air permeability of not more than 0.5 cc/cm$^2$/sec and an average pore size of not more than 5 $\mu$m. On the contrary, If the average single fiber fineness is not less than 8.9 decitex, the semipermeable membrane support is likely to have an air permeability of not less than 7.00 cc/cm$^2$/sec and an average pore size of not less than 15 $\mu$m.

Binder Fiber Used in the Present Invention

The non-woven fabric for the semipermeable membrane support may be preferably made by mixing the main fiber and the binder fiber. The non-woven fabric may be made without the binder fiber mixed. If the non-woven fabric is made with the binder fiber mixed, the resulting non-woven fabric may have an enhanced strength due to the weld of the fiber at the intersection point by the binder fiber during thermal pressing process, and a smooth surface, resulting in a more preferable fabric for the semipermeable membrane support. The binder fiber may include a thermoplastic fiber such as polyester fiber, polyolefin fiber, nylon fiber, alamide fiber, polyphenylene sulfide fiber and the like. Of them, the polyester-based binder fiber may be most preferable, comprehensively considered in term of mechanical strength, thermal process characteristics and cost.

The polyester-based binder fiber may include a low melting point polyester fiber, an undrawn polyester fiber and so on. The melting point or glass transition point of the polyester based binder fiber is lower than that of the main fiber and preferably within the range of 120 to 260° C.

The mixing amount of the binder fiber may be preferably determined on the basis of the binding degree of the main fibers. The above-mentioned amount may be preferably 20 to 80% by weight, more preferably 30 to 70% by weight. If the mixing amount of the binder fiber is too small, the resulting fabric is likely to have a low strength and uneven surface. If the mixing amount of the binder fiber is too large, the cost is high and the desired air permeability is less liable to be achieved.

Process of Dispersion and Mixing

The non-woven fabric is made in the above-mentioned mixing ratio according some manufacturing process such as dry method, wet method and so on. However, the wet method may be preferably used, because wholly even non-woven fabric can be obtained. According to the wet method, first, the main fiber and the binder fiber are dispersed into water evenly, and then passed through the process such as a screening process (for example, for removal of foreign matters, agglomerates and the like), so as to adjust the final fiber concentration to 0.01 to 0.50% by weight. And then, the paper is made.

Some reagents such as a co-dispersant, defoaming agent, hydrophilic agent or anti-static agent may be added to obtain more even non-woven fabric.

The non-woven fabric is made as one sheet with a paper making machine according to the wet method. Some sheets may be made according to the wet method and then laminated. The non-woven fabric made by laminating some sheets according to the wet method is more even.

Process for Making Paper

The support of the present invention has a ratio of a tensile strength in the paper feeding direction to that in the width direction of 2:1 to 1:1. Therefore, the adjustment must be performed in the process of making paper to achieve the above-mentioned ratio. It is suitable to make paper on the inclined wire cloth so as to adjust the tensile strength ratio to the above-mentioned range.

The tensile strength ratio can be adjusted to the above-mentioned range by controlling the concentration of the material dispersion mixed solution, flow velocity, the rate of the wire in the inclined wire cloth, the inclination angle and so on.

Thermal Pressing Process

The resulting fabric is heated and pressed, resulting in a semipermeable membrane support. The thermal pressing process will be described in the following part, but the present invention is not limited to the below-mentioned process.

The fabric is transported in the state pinched between two rollers and heated and pressed continuously. Both or either one of two rollers is used as a heat roller. The degree of thermal pressing is controlled by adjusting the surface temperature of the heat roller, the pinching force of the rollers, and the transporting velocity of the non-woven fabric, or time of pressing the fabric. The surface temperature of the roller is preferably 150 to 260° C., more preferably 200 to 240° C. The pinching force of the rollers is preferably 20 to 180 kg/cm, more preferably 40 to 150 kg/cm. The transporting velocity of the non-woven fabric is preferably 10 to 100 m/min, more preferably 20 to 60 m/min. The non-woven fabric to be transported may be a single layer, layered structure made of several layers of one kind, or layered structure of several layers of some kinds. The non-woven fabric which has been heated and pressed and the non-woven fabric which has not been yet processed may be laminated and bonded by means of the thermal pressing process.

The surface temperature of the heat roller, the pinching force of the rollers and the transporting velocity of the non-woven fabric are adjusted on the basis of the desired characteristics of the semipermeable membrane support. The process conditions of the front and rear surfaces must be changed to make central line average roughness of the front and rear surfaces of the semipermeable membrane support to be different by not less than 15%. When the surface temperature of the heat roller and the pinching force of the roller are high and the transporting velocity of the non-woven fabric is slow, large amount of heat is absorbed. On the contrary, when the surface temperature of the heat roller and the pinching force of the roller are low and the transporting velocity of the non-woven fabric is fast, small amount of heat is absorbed.

The above-mentioned conditions and the size and mixing ratio of the material fibers to be used in the paper making process are controlled well, so as to obtain a semipermeable membrane support having a different central line average roughness between the front and rear surfaces by not less than 15%.

Process for Applying the (Polymer) Casting Solution

One example of the process in which the (polymer) casting solution is applied to one surface of the semipermeable membrane support of the present invention will be described.

As in the membrane forming process (c), the support is transported along the drum (roller) while the (polymer) casting solution is applied to the upper surface of the support in the state of membrane. The (polymer) casting solution is filled in the hopper located above the drum (roller). The hopper has a lower end close to the surface of the support, so as to prevent the (polymer) casting solution from leaking through the slit between the hopper and the support.

The support is introduced into the coagulation bath along the drum (roller) so as to solidify the (polymer) casting solution that has been applied to the support. When the support is introduced into the coagulation bath, the support leaves the drum (roller) and is immersed in the bath.

The polymer solution may be prepared by dissolving, for example, polysulfone at the concentration of about 16.5% by weight into N,N-dimethylformamide (DMF). When this polymer solution contacts with water, polysulfone is coagulated and solidified. Therefore, such a polymer solution is immersed into the coagulation bath including water and coagulated. Then, the support passing through the coagulation bath is immersed into the rinsing bath to remove the remaining DMF, and further to be solidified. Thus, the polysulfone layer of 20 to 100 μm is formed on the surface of the support.

If the ratio of the tensile strength in the paper feeding direction to that in the width direction of the support is large during this process, the support is likely to bend in the width direction during formation of the semipermeable membrane, resulting in the failure of the transportation of the support with a roller. According to the present invention, the ratio of the tensile strength of the support in the paper feeding direction to that in the width direction is adjusted to the range of 2:1 to 1:1 and therefore, the bend of the support can be controlled within the tolerable range with no hindrance to the roller transportation.

Thereafter, the active layer (skin layer) is coated on the surface of the semipermeable membrane. The active layer is made of cellulose such as cellulose acetate, polyamides, polyimides and the like depending on its application. The active layer has a smaller thickness than the semipermeable membrane.

Generally, the semipermeable membrane on which the active layer has not been yet coated is called a microfiltration membrane or ultrafiltration membrane. While, the semipermeable membrane on which the active layer has been already coated is called a nano-filtration membrane or reverse osmosis membrane.

The support of the present invention finds extensive application in such wide fields as desalination and water reuse, dairy, foods, remedy, chemistry, nuclear engineering, coloring process engineering, and the like, and can be used as a support for a respective semipermeable membrane.

The present invention will be described in details in the following examples, but is not limited thereto. The properties in the examples were obtained in the following way. In the following examples, % means % by weight, unless otherwise specified.

Weight was determined on the basis of JIS P 8124.

Thickness was determined on the basis of JIS P 8118.

Ratio of tensile strength was determined by measuring the tensile strengths in the longitudinal direction (paper feeding direction) and in the transverse direction (paper width direction) on the basis of JIS P 8113 and then, calculating the strength in the longitudinal direction/that in the transverse direction.

Air permeability was measured with a Fragile-type testing machine on the basis of JIS L 1096.

Surface roughness was determined on the basis of JIS B 0601.

Pore size was determined on the basis of the bubble point method (ASTM F316-86, JIS K 3832). The pore size (average pore diameter) in the support is an index of whether there are many small pores or not, when the air permeability is at the same level.

EXAMPLE 1

60% of drawn polyethylene terephthalate (PET) fibers having an average single fiber fineness of 1.7 decitex and 3.3 decitex and a fiber length of 5 mm and 40% of undrawn PET fibers having an average single fiber fineness of 1.2 decitex and a fiber length 5 mm were dispersed fully in the chest to prepare an aqueous slurry having a fiber concentration of 0.05%. The resulting slurry was transported to the inclined wire cloth paper making machine and a non-woven fabric, three-dimensional assembly of the fibers, was made while the ratio of tensile strength in the paper feeding direction to that in the width direction was controlled (weight: 68 g/m$^2$).

Both faces of the resulting non-woven fabric were processed under the conditions that temperature was 225° C., the pressure was 60 kg/cm, and the speed was 25 m/min, with a calender comprising a combination of a heating metallic roller and elastic roller.

The properties of the resulting support are shown in table 1.

COMPARATIVE EXAMPLE 1

The aqueous slurry was prepared using the same mixing ratio and in the same way as in Example 1. Using the resulting slurry, paper was made with a cylinder machine (weight: 68 g/m$^2$).

Calendering was performed under the same conditions as in Example 1.

COMPARATIVE EXAMPLE 2

A paper making web A' (weight: 34 g/m$^2$) was made with a cylinder machine using the same mixing ratio and in the same way as in Example 1.

Next, a paper making web B (weight: 34 g/m$^2$) was made with a cylinder machine from 60% of drawn PET fibers having an average single fiber fineness of 3.3 decitex and a length of 5 mm and 40% of undrawn PET fibers having an average single fiber fineness of 1.2 decitex and a length 5 mm under the same conditions as in Example 1.

The paper making web A' was processed with the similar calender to that in Example 1, under the conditions that temperature was 220° C., the pressure was 100 kg/cm, and the speed was 50 m/min.

Then, the paper making web B and the paper making web A' as processed in the above-mentioned way were laminated and processed under the conditions that temperature was 230° C., the pressure was 130 kg/cm, and the speed was 40 m/min.

TABLE 1

|  | Example 1 | Comparative Example 1 | Comparative Example 2 |
|---|---|---|---|
| Weight (g/m²) | 70 | 70 | 71 |
| Thickness (μm) | 96 | 94 | 87 |
| Tensile strength ratio Longitudinal/transverse | 1.3 | 4.2 | 4.4 |
| Air permeability (cc/cm²/sec) | 3.4 | 3.1 | 5.0 |
| Difference in surface roughness (%) | 33.4 | 28.6 | 14.7 |
| Pore size Average value (μ) | 10.1 | 10.3 | 12.1 |

The (polymer) casting solution was applied to the supports obtained according to Example 1, Comparative Examples 1 and 2 in the membrane making process. In Example 1, the bend of the support in the width direction was a little and the formed membrane was even and had good membrane properties.

On the contrary, in Comparative Examples 1 and 2, the bend of the support in the width direction was large and thereby, the support could not pass through the process smoothly, resulting in occurrence of wrinkles.

Figure 2A:
FIGS. 2A and 2B show microphotographs of the supports (magnified by 200 times) made by means of the method of the present invention and the conventional method, respectively.
Figure 2B:

FIGS. 2A and 2B show microphotographs of the sample in Example 1, in which the ratio of the tensile strength in the paper feeding direction to that in the width direction is small, and of the sample in Comparative Example 2, in which conventionally, the ratio of the tensile strength is large, by an electron microscope, respectively.

These microphotographs apparently show that the orientation of the fibers is different between the two samples. As shown in FIG. 2B, since the fibers are orientated in the longitudinal direction, the tensile strength ratio is large and the bend in the width direction of the support is large when the (polymer) casting solution is applied to the support. On the contrary, as shown in FIG. 2A, since the fibers are in a random orientation to some extent, the tensile strength ratio is small and the bend in the width direction of the support is small even when the (polymer) casting solution is applied to the support. The binder fibers lie between the main fibers and bind them due to the thermal transformation.

As mentioned above, the present invention provides a semipermeable membrane support and a process for making the same, in which the semipermeable membrane support in the single layer structure having the same effects as those of the two-layered structure can be achieved at low costs without a hindrance in the production of the semipermeable membrane from the base paper. Conventionally, an attempt to realize a desired filtration resistance has been made by setting a certain difference in surface roughness between the front and rear surfaces of the support in a single layer structure. However, since the support bent in the width direction when the (polymer) casting solution was applied to one surface of the support, the processing of the support in the coagulation and rinsing bath after roll transportation was hindered, resulting in formation of an uneven semipermeable membrane. According to the present invention, the semipermeable membrane support having a ratio of the tensile strength in the paper feeding direction to that in the width direction of 2:1 to 1:1 is used, so as to solve the above-mentioned problems. The semipermeable support in such a structure has a property of preventing the bend in the width direction. Even when the (polymer) casting solution is applied to one surface of the support, the roll transportation and processing in the coagulation and rinsing baths of the support can be achieved without the bend in the width direction, with the result that the semipermeable membrane having an excellent quality can be made.

Although the present invention has been filly described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A semipermeable membrane support comprising,
    a non-woven fabric consisting of a single layer consisting of a mixture of main fiber and binder fiber, both of which are formed of synthetic resin fine fiber, the non-woven fabric being manufactured by paper making, heating and pressing,
    wherein the non-woven fabric has an air permeability of 0.5 to 7.0 cc/cm²/sec, and an average pore size of 5 to 15 μm,
    wherein the semipermeable membrane support has a ratio of a tensile strength in a paper feeding direction to that in a width direction of 2:1 to 1:1,
    wherein the main fiber is formed of polyester fiber having an average single fiber fineness of 0.6 to 8.9 decitex, and
    wherein the binder fiber is formed of polyester fiber having an average single fiber fineness of 0.6 to 8.9 decitex.

2. A semipermeable membrane support according to claim 1, wherein the semipermeable membrane support has a capability of preventing bending thereof in the width direction during a manufacture of the semipermeable membrane.

3. A semipermeable membrane support according to claim 2, wherein the semipermeable membrane support has the ratio of the tensile strength in the paper feeding direction to that in the width direction of 1.5:1 to 1:1.

4. A semipermeable membrane support according to claim 1, wherein a central line average roughness of a front surface of the semipermeable membrane support is larger than that of a rear surface of the semipermeable membrane support by 15% or more, and wherein the semipermeable membrane support has an anchor effect to a semipermeable membrane when the semipermeable membrane support is applied with the semipermeable membrane on the front surface thereof.

5. A method of manufacturing a semipermeable membrane support according to claim 1 comprising the steps of:
    preparing a dispersed and mixed solution by dispersing and mixing in a solution main fiber and binder fiber, both of which are formed of polyester fiber having an average single fiber fineness of 0.6 to 8.9 decitex, in a mixing ratio of 20:80 to 70:30;

making paper from the dispersed and mixed solution while controlling a flow rate of the dispersed and mixed solution so that the semipermeable membrane support has a ratio of tensile strength in a paper feeding direction to that in a width direction of 2:1 to 1:1; and heating and pressing the paper so that the semipermeable membrane support has a surface roughness of a front surface is larger than that of a rear surface by 15% or more after drying.

6. A method of manufacturing a semipermeable membrane support according to claim 5, wherein the step of making paper is performed by using an inclined wire cloth machine.

7. A method of manufacturing a semipermeable membrane including a non-woven fabric containing main fiber and binder fiber, both of which are formed of synthetic resin fine fibers having an average single fiber fineness of 0.6 to 8.9 decitex, the non-woven fabric being manufactured by heating and pressing after paper making, said method comprising the steps of:

applying a polymer solution to at least one surface of the semipermeable membrane support according to claim 1 which has a ratio of a tensile strength in a paper feeding direction to that in a width direction of 2:1 to 1:1;

roll feeding the semipermeable membrane support to a coagulation and rinsing bath so that the semipermeable membrane support is not bent in a width direction; and coagulating and rinsing the semipermeable membrane support in the coagulation and rinsing bath.

8. A semipermeable membrane paper support comprising, a calendared non-woven fabric consisting of a single layer consisting of a mixture of main fiber and binder fiber, both of which are formed of synthetic resin fine fiber, wherein the non-woven fabric has an air permeability of 0.5 to 7.0 $cc/cm^2/sec$, and an average pore size of 5 to 15 $\mu m$, wherein the semipermeable membrane paper support has a ratio of a tensile strength in a paper feeding direction to that in a width direction of 2:1 to 1:1, wherein the main fiber is formed of polyester fiber having an average single fiber fineness of 0.6 to 8.9 decitex, and wherein the binder fiber is formed of polyester fiber having an average single fiber fineness of 0.6 to 8.9 decitex.

9. A semipermeable membrane paper support according to claim 8, wherein the semipermeable membrane paper support has a capability of preventing bending thereof in the width direction during a manufacture of the semipermeable membrane.

10. A semipermeable membrane paper support according to claim 9, wherein the semipermeable membrane paper support has the ratio of the tensile strength in the paper feeding direction to that in the width direction of 1.5:1 to 1:1.

11. A semipermeable membrane paper support according to claim 8, wherein a central line average roughness of a front surface of the semipermeable membrane paper support is larger than that of a rear surface of the semipermeable membrane paper support by 15% or more, and wherein the semipermeable membrane paper support has an anchor effect to a semipermeable membrane when the semipermeable membrane paper support is applied with the semipermeable membrane on the front surface thereof.

* * * * *